(12) United States Patent
Travis

(10) Patent No.: US 11,644,287 B2
(45) Date of Patent: May 9, 2023

(54) SINGLE-ACTUATOR ROTATIONAL DEPLOYMENT MECHANISM FOR MULTIPLE OBJECTS

(71) Applicant: Raytheon Company, Waltham, MA (US)

(72) Inventor: Robert D. Travis, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 707 days.

(21) Appl. No.: 16/440,248

(22) Filed: Jun. 13, 2019

(65) Prior Publication Data

US 2020/0393223 A1 Dec. 17, 2020

(51) Int. Cl.
 *F42B 10/14* (2006.01)
 *F42B 10/38* (2006.01)
 *F42B 15/01* (2006.01)

(52) U.S. Cl.
 CPC .............. *F42B 10/14* (2013.01); *F42B 10/38* (2013.01); *F42B 15/01* (2013.01)

(58) Field of Classification Search
 CPC .................................. F42B 10/14; B64C 3/56
 See application file for complete search history.

(56) References Cited

U.S. PATENT DOCUMENTS

| | | |
|---|---|---|
| 2,699,300 A | 1/1955 | Trotter et al. |
| 3,469,806 A | 9/1969 | Olchawa |
| 4,664,339 A | 5/1987 | Crossfield |
| 4,717,093 A | 1/1988 | Rosenberger et al. |

(Continued)

FOREIGN PATENT DOCUMENTS

| | | |
|---|---|---|
| AU | 584637 B2 | 6/1989 |
| CN | 206664921 U | 11/2017 |

(Continued)

OTHER PUBLICATIONS

Landon, Steven D., "Development of Deployable Wings for Small Unmanned Aerial Vehicles Using Compliant Mechanisms" (Jul. 6, 2007); BYU; All Theses and Dissertations; 952 [https://scholarsarchive.byu.edu/etd/952].

(Continued)

*Primary Examiner* — Richard Green
*Assistant Examiner* — Arfan Y. Sinaki
(74) *Attorney, Agent, or Firm* — Renner, Otto, Boisselle & Sklar, LLP

(57) ABSTRACT

A deployment system, such as for deploying wings, includes a pair of hub assemblies that transmit linear motion provided by an actuator into a combination of rotational and axial motion. The actuator works on both hub assemblies, rotating (for each wing) a slew ring that is coupled to a lift bar that acts as a follower, following a pair of cam slots, to allow the wings to follow their desired course. In one embodiment the wings move axially away from a fuselage at the beginning of the deployment movement, followed by a primarily rotational movement, with the wings pulling in toward the fuselage at the end of the deployment process. The actuator includes a pair of threaded shafts (threaded in opposite directions) that rotate along with a pinion gear, driven by a motor, to translate a pair of retractor links that are coupled to the slew rings.

19 Claims, 11 Drawing Sheets

(56) References Cited

U.S. PATENT DOCUMENTS

| | | | | |
|---|---|---|---|---|
| 5,480,111 | A * | 1/1996 | Smith | F42B 10/14 |
| | | | | 244/3.29 |
| 5,829,715 | A | 11/1998 | Banks | |
| 6,726,147 | B1 * | 4/2004 | Perini | F42B 10/64 |
| | | | | 244/3.28 |
| 7,185,847 | B1 | 3/2007 | Bouchard et al. | |
| 8,089,034 | B2 | 1/2012 | Hammerquist | |
| 8,258,447 | B2 | 9/2012 | Blake et al. | |
| 8,894,004 | B1 | 11/2014 | Scott et al. | |
| 8,921,749 | B1 * | 12/2014 | Scott | F42B 10/14 |
| | | | | 244/3.28 |
| 8,946,607 | B2 | 2/2015 | Gettinger | |
| 9,689,650 | B2 | 6/2017 | Vainshtein et al. | |
| 2003/0178527 | A1 * | 9/2003 | Eisentraut | F42B 10/14 |
| | | | | 244/3.28 |
| 2006/0163423 | A1 * | 7/2006 | Parine | F42B 10/14 |
| | | | | 244/3.27 |
| 2007/0125904 | A1 * | 6/2007 | Janka | F42B 10/14 |
| | | | | 244/3.28 |
| 2008/0087763 | A1 | 4/2008 | Sheahan, Jr. et al. | |
| 2010/0050712 | A1 * | 3/2010 | Tong | B64G 1/222 |
| | | | | 70/185 |
| 2010/0264260 | A1 * | 10/2010 | Hammerquist | B64C 3/56 |
| | | | | 244/49 |
| 2011/0180657 | A1 | 7/2011 | Gionta et al. | |
| 2016/0355250 | A1 * | 12/2016 | Barnes | B64C 3/56 |
| 2017/0355440 | A1 * | 12/2017 | Bishop | B64C 3/56 |
| 2018/0112958 | A1 * | 4/2018 | Willenbring | F42B 10/14 |
| 2018/0112959 | A1 | 4/2018 | Buttolph | |

FOREIGN PATENT DOCUMENTS

| | | |
|---|---|---|
| EP | 0013096 B1 | 4/1983 |
| WO | 95/31689 A1 | 11/1995 |
| WO | 2014/203237 A2 | 12/2014 |
| WO | 2016/196277 | 12/2016 |

OTHER PUBLICATIONS

Miniature Air Launched Decoy (MALD®) & Future Concepts; Raytheon Company; Oct. 20, 2010.

Miniature Air Launched Decoy; Effects-Based Solution to Adversary Air Defenses; Raytheon Company; 2008.

International Search Report and Written Opinion dated Jul. 16, 2020 in corresponding International Application PCT/US2020/025259.

* cited by examiner

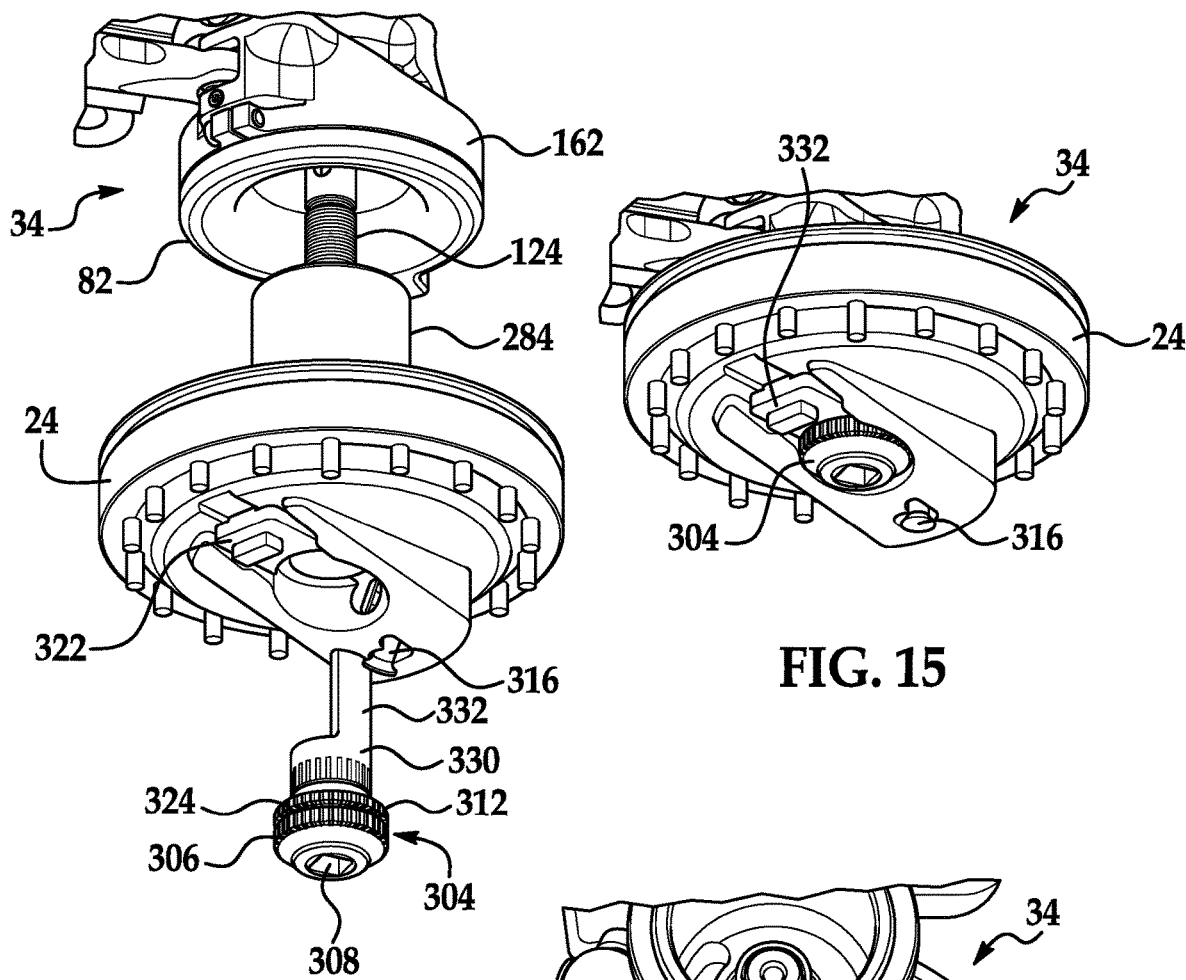
FIG. 14
FIG. 15
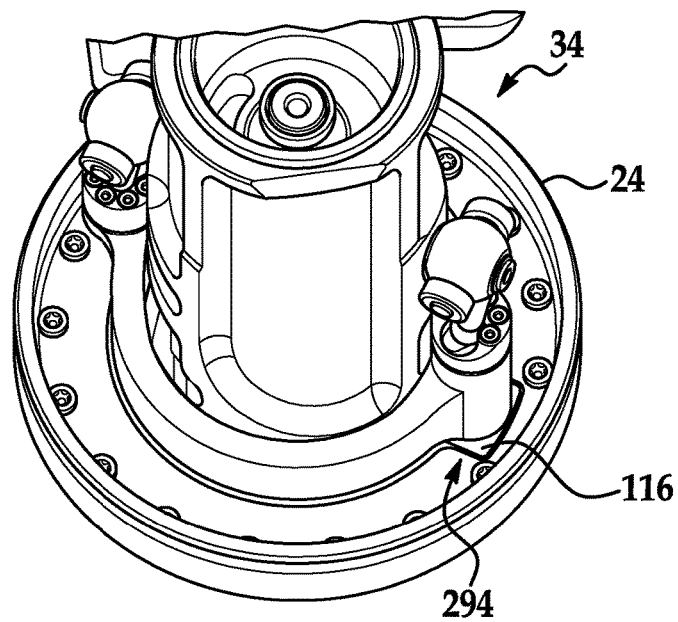
FIG. 16

SINGLE-ACTUATOR ROTATIONAL DEPLOYMENT MECHANISM FOR MULTIPLE OBJECTS

FIELD OF THE INVENTION

The invention is in the field of deployment mechanisms, such as for wings.

DESCRIPTION OF THE RELATED ART

Until recently, most bombs were of the unguided, gravity type. The bomb was aimed by the motion of the aircraft on which it was carried and which flew approximately over the target. The bomb was released from a location on the flight path estimated to cause the bomb to fall onto its target. After the bomb was dropped there was no control over its motion. The result was that the aircraft was exposed to defensive measures over the target for an extended period of time in a flight path that was required to be straight and level, and the accuracy of the bombing was always somewhat problematic.

Recent developments improved upon this type of earlier munition in important ways. Wings were affixed to the bomb so that it could be dropped at a distance from the target of many miles and would glide to its target. The bomber aircraft consequently had far less exposure to defensive measures. The glide bomb was also provided with movable control surfaces and a guidance system, typically based upon cooperation with a laser designator, an inertial navigation system, or the global positioning system. The guidance capability greatly improved the accuracy of the bombing and reduced collateral damage.

The flight distance of a glide bomb depends upon several factors, one of which is the length of the wings. Long, slender wings result in long glide distances. However, long, slender wings take up a great deal of space in the bomb deployment racks on the launching aircraft. It has therefore become an established practice to fold the wings to a folded position along the fuselage of the glide bomb for storage, and then to pivot the wings to an open, deployed position when the bomb is dropped.

However, even this approach is not fully satisfactory in that it does not permit optimal-length and optimal-performance wings to be used with many types of bombs. There is accordingly a need for an improved approach to glide bombs and other types of winged weapons such as some types of powered missiles, which further improves their aerodynamic performance.

Many other wing deployment mechanisms have been tried previously, such as by deploying wings from internal slots in a fuselage.

One example of a prior approach is that described in U.S. Pat. No. 7,185,847, which involves a winged vehicle includes an elongated fuselage, and a wing mechanism affixed to the fuselage. The wing mechanism has a wing-support-body track affixed to and extending lengthwise along the fuselage, a translating wing-support body engaged to and translatable along the wing-support-body track, and exactly two deployable cantilevered wings. Each deployable cantilevered wing has a wing pivot mounted to the translating wing-support body so that the deployable cantilevered wing is pivotable about the translating wing-support body. The two deployable cantilevered wings are each pivotable between a stowed position and a deployed position.

SUMMARY OF THE INVENTION

A wing deployment system includes a single actuator moving both wings from a stowed state to a deployed state, using a combination of rotation and axial movement (in the direction of the axis of the rotation). This provides deployment simultaneously in a manner that is symmetric (balanced), and that minimizes aerodynamic disturbance, and further allows the wings to be located outside of an air vehicle fuselage. Having the wings external to the fuselage frees up volume within the fuselage, for example for use in carrying additional fuel or payload items. In addition the compact size and efficient operation, such as with a reduced part count and complexity, provides an advantage over prior approaches.

A deployment system includes a single actuator moving a pair of objects to be deployed from a stowed state to a deployed state, using a combination of rotation and axial movement (in the direction of the axis of the rotation).

According to an aspect of the invention, a deployment mechanism or system includes: a mount configured to receive a device to be deployed; a hub assembly that includes a tube having a cam slot; and an actuator configured to rotate the mount relative to the tube; wherein when the actuator causes the mount to rotate relative to the tube, a follower engaging the cam slot causes the mount to move both axially and rotationally relative to the tube.

According to an embodiment of any paragraph(s) of this summary, the follower is part of a bar that passes through the hub assembly.

According to an embodiment of any paragraph(s) of this summary, the cam slot is a first cam slot; and the tube includes a second cam slot diametrically opposed to the first cam slot.

According to an embodiment of any paragraph(s) of this summary, the cam slots are J-shape cam slots.

According to an embodiment of any paragraph(s) of this summary, each of the cam slots a terminus of the cam slot is substantially axial in orientation.

According to an embodiment of any paragraph(s) of this summary, each of the cam slots the terminus has a reduced width, providing less clearance about the follower than other portions of the cam slot.

According to an embodiment of any paragraph(s) of this summary, circular cross-section ends of the bar engage the cam slots.

According to an embodiment of any paragraph(s) of this summary, the bar has a rectangular cross-section center portion that is between the circular cross-section ends.

According to an embodiment of any paragraph(s) of this summary, the tube is an outer tube.

According to an embodiment of any paragraph(s) of this summary, the hub assembly further includes an inner tube within the outer tube, wherein the inner tube is connected to the mount and moves along with the mount.

According to an embodiment of any paragraph(s) of this summary, the center portion of the bar engages diametrically-opposed rectangular openings in the inner tube.

According to an embodiment of any paragraph(s) of this summary, the hub assembly further includes a tension rod located along a central axis of the hub assembly, wherein the tension rod mechanically engages the inner tube and the mount.

According to an embodiment of any paragraph(s) of this summary, the tension rod includes a rectangular window therethrough that receives and engages the center portion of the bar.

According to an embodiment of any paragraph(s) of this summary, the hub assembly further includes a tension rod located along a central axis of the hub assembly, wherein the tension rod mechanically engages the inner tube and the mount.

According to an embodiment of any paragraph(s) of this summary, the tension rod has opposite first and second threaded ends.

According to an embodiment of any paragraph(s) of this summary, the first threaded end has a pair of nuts thereon that bear on opposite major surfaces of a platform that is within the inner hub.

According to an embodiment of any paragraph(s) of this summary, the second threaded end threadedly engages the mount.

According to an embodiment of any paragraph(s) of this summary, the tension rod has a spring therearound that provides a biasing force between the inner hub and the mount.

According to an embodiment of any paragraph(s) of this summary, the system further includes a slew ring that is mechanically coupled to the actuator such that the actuator selectively rotates the slew ring about the hub assembly.

According to an embodiment of any paragraph(s) of this summary, the follower is part of a bar that passes through the hub assembly.

According to an embodiment of any paragraph(s) of this summary, the system further includes walking links that mechanically couple the slew ring to the bar.

According to an embodiment of any paragraph(s) of this summary, the slew ring, the walking links, and the bar all rotate as a unit about a central axis of the hub assembly.

According to an embodiment of any paragraph(s) of this summary, the walking links have ball-and-socket connections with the slew ring.

According to an embodiment of any paragraph(s) of this summary, the walking links have cross-joint connections with ends of the bar.

According to an embodiment of any paragraph(s) of this summary, the system further includes bearings between the slew ring and the hub assembly.

According to an embodiment of any paragraph(s) of this summary, the actuator includes a threaded shaft, driven by a motor, that when the shaft is turned moves along the shaft a link tube that is coupled to the slew ring.

According to an embodiment of any paragraph(s) of this summary, the actuator is a ball screw actuator, and wherein the ball screw actuator further includes a ball screw nut that is attached to the link tube, and that moves along the shaft along with the link tube.

According to an embodiment of any paragraph(s) of this summary, the actuator further includes gearing between a motor shaft of the motor, and the threaded shaft.

According to an embodiment of any paragraph(s) of this summary, the gearing includes a spur gear having at least 120 teeth.

According to an embodiment of any paragraph(s) of this summary, the actuator further includes a motor brake for selectively preventing the motor from turning a motor shaft of the motor.

According to an embodiment of any paragraph(s) of this summary, the slew ring includes a detent mechanism for locking the deployment mechanism in place.

According to an embodiment of any paragraph(s) of this summary, the system further including a frame to which the hub assembly is attached and to which the actuator is mechanically coupled.

According to an embodiment of any paragraph(s) of this summary, the actuator is mechanically coupled to the frame by a hinge connection.

According to an embodiment of any paragraph(s) of this summary, the mount is a first mount; the hub assembly is a first hub assembly; and further including: a second mount configured to receive a second device to be deployed; and a second hub assembly that includes a second hub having a second cam slot; wherein the actuator is configured to rotate the second mount relative to the second hub; and wherein when the actuator causes the second mount to rotate relative to the second hub, a second follower engaging the second cam slot causes the mount to move both axially and rotationally relative to the hub.

According to an embodiment of any paragraph(s) of this summary, the actuator is configured to rotate the first mount and the second mount in opposite directions.

According to an embodiment of any paragraph(s) of this summary, the actuator includes a pair of ball screw actuators, driven by a motor through a common reduction gear set.

According to an embodiment of any paragraph(s) of this summary, the deployment system is a wing deployment system used to deploy wings that are attached to the mounts.

According to an embodiment of any paragraph(s) of this summary, the wing deployment system is part of an aerial vehicle.

According to another aspect of the invention, an actuator includes: a motor; gearing operatively coupled to the motor, wherein the gearing includes a pinion gear; a pair of threaded shafts attached to and rotating with the spur gear; and a pair of retractor links that move along respective of the threaded shafts as the spur gear is turned by the motor; wherein the threaded shafts are threaded in opposite orientations relative to each other, such that the retractor links move in opposite directions along the threaded shafts.

According to an embodiment of any paragraph(s) of this summary, each of the retractor links includes: a ballscrew nut that threadedly engages one of the threaded shafts; and a hollow link tube attached to the ballscrew nut, with the link tube receiving the one of the threaded shafts therein.

According to another aspect of the invention, a method of deploying wings of an aerial vehicle includes: using an actuator to turn a pair of wing mounts coupled to respective hub assemblies, wherein hub assemblies include respective cam followers that follow cam slots, to move the wing mounts in both axial and rotational directions, and thereby move the wings, which are coupled to respective of the wing mounts.

According to an embodiment of any paragraph(s) of this summary, the wings have an initial axial movement away from a fuselage of the aerial vehicle, and are pulled axially in toward the fuselage as the wings are deployed.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 14 is an exploded view of parts the system of FIG. 3, highlighting the connection of a wing mount to a hub assembly.

FIG. 15 is an oblique view of the parts of FIG. 14.

FIG. 16 is another oblique view of the parts of FIG. 14.

DETAILED DESCRIPTION

A deployment system, such as for deploying wings, includes a pair of hub assemblies that transmit linear motion provided by an actuator into a combination of rotational and axial motion. The actuator works on both hub assemblies, rotating (for each wing) a slew ring that is coupled to a lift bar that acts as a follower, following a pair of cam slots, to allow the wings to follow their desired course. In one embodiment the wings move axially away from a fuselage at the beginning of the deployment movement, followed by a primarily rotational movement, with the wings pulling in toward the fuselage at the end of the deployment process. The actuator includes a pair of threaded shafts (threaded in opposite directions) that rotate along with a spur gear, driven by a motor, to translate a pair of retractor links that are coupled to the slew rings. The retractor links may include ballscrew mechanisms that engage the threaded shafts. The use of a single actuator to deploy both wings simultaneously provides symmetry in the deployment. The actuator may be mounted on a hinge mechanism to allow it to shift position during the deployment.

Figure 1:
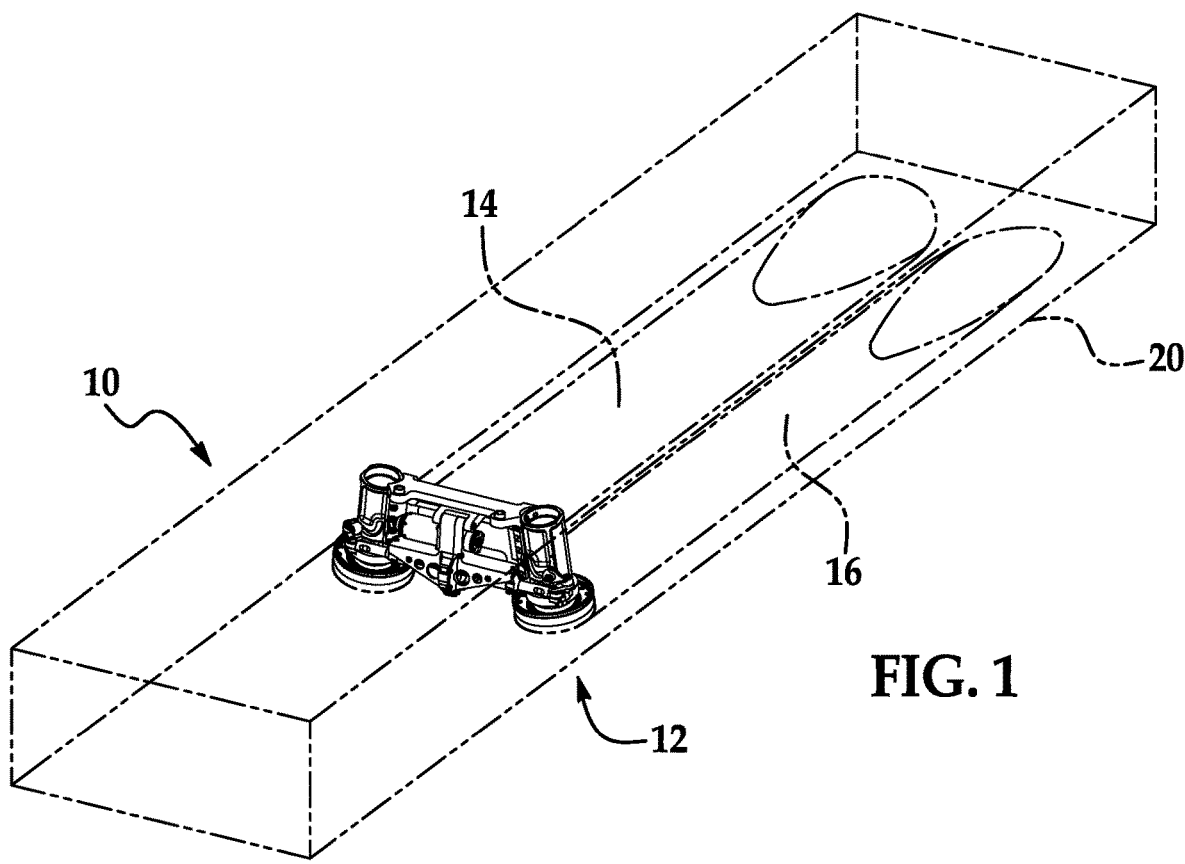
FIG. 1 is an oblique view of a wing deployment system as part of an aircraft, according to an embodiment of the invention, with wings in a stowed position.
Figure 2:
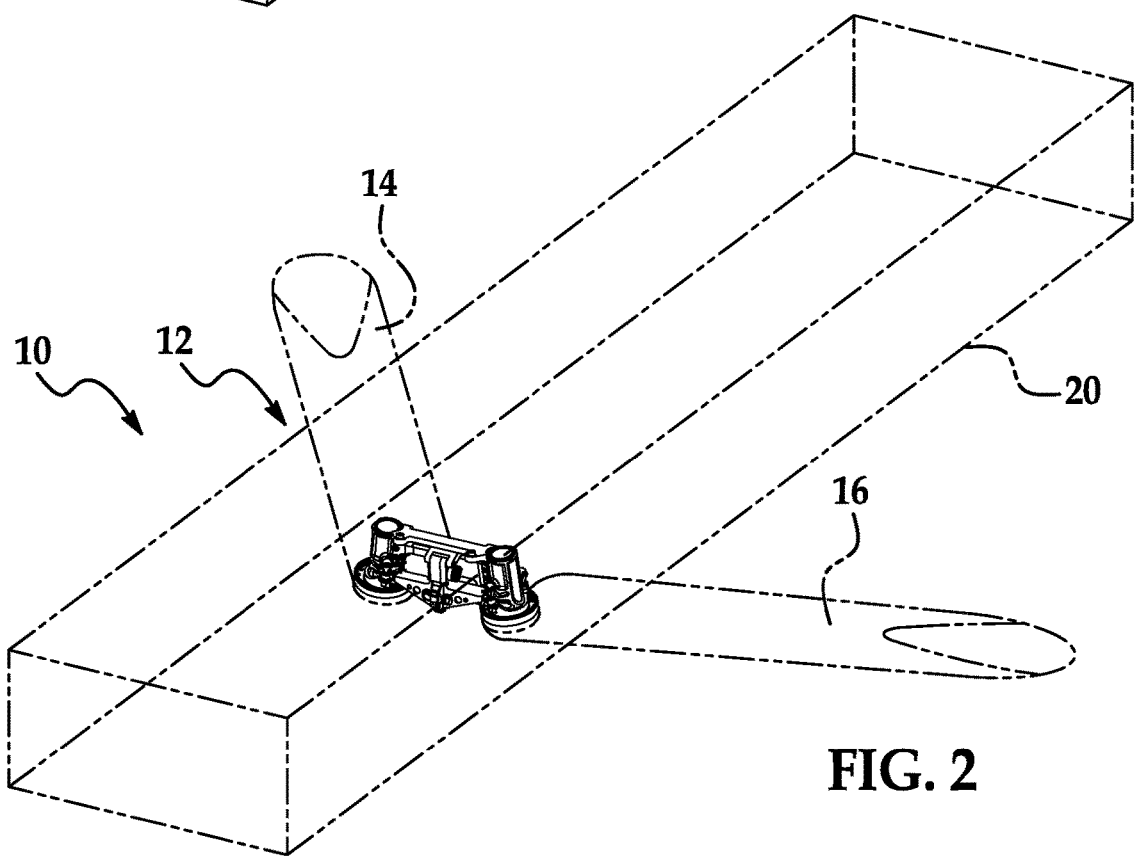
FIG. 2 is an oblique view of the deployment system of FIG. 1, with the wings in a deployed position.

Referring initially to FIGS. 1 and 2, an aircraft 10, such as an unmanned aerial vehicle (UAV) or missile (e.g., a cruise missile), includes a deployment system or mechanism 12, for deploying a pair of wings 14 and 16. FIG. 1 shows the wings 14 and 16 in a stowed position, outside and along an outer surface of a fuselage 20 of the aircraft 10. FIG. 2 shows the wings 14 and 16 in a deployed position. The use in the aircraft 10 is only one example of how the deployment system 12 may be employed, and such a system may be used to deploy or move other sorts of devices.

Figure 3:
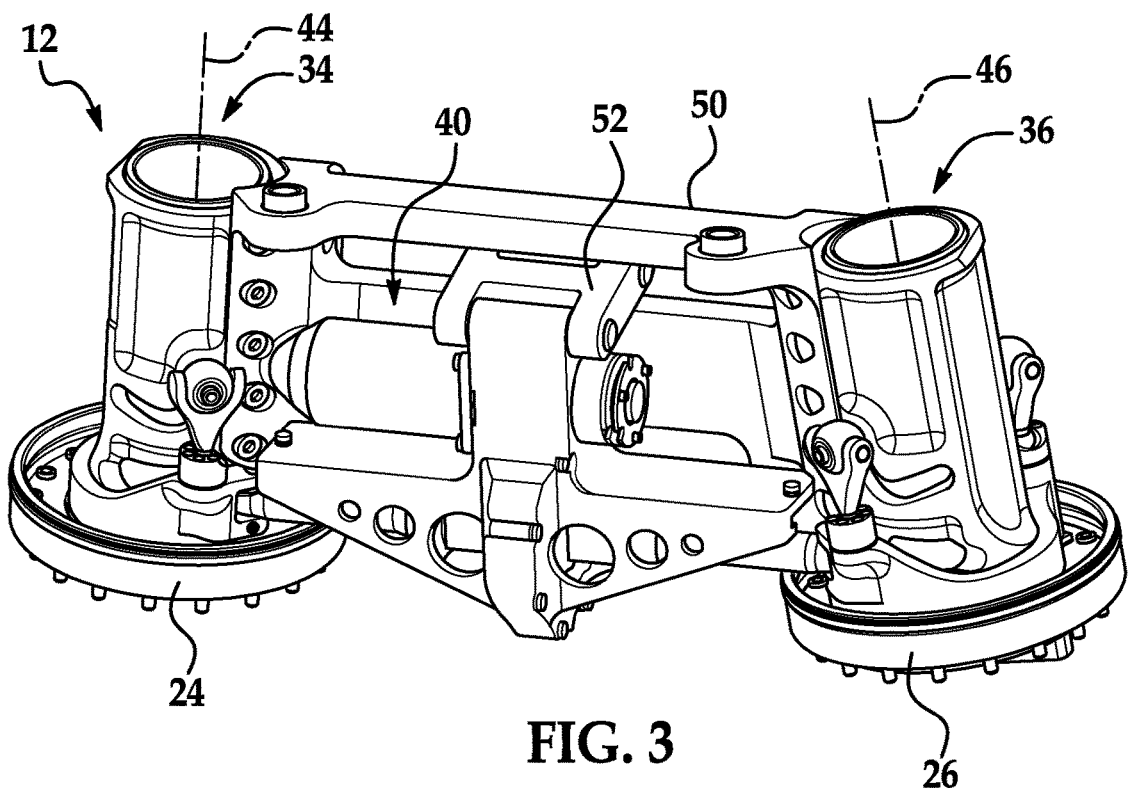
FIG. 3 is an oblique view of the operative parts of the deployment system of FIG. 2.

FIG. 3 shows further details of the deployment system 12. The system 12 includes a pair of wing mounts 24 and 26 to which the wings 14 and 16 (FIG. 1) are coupled. The wing mounts 24 and 26 are mechanically coupled to parts of a pair of hub assemblies 34 and 36. An actuator 40 is used to rotate parts of the hub assemblies about central axes 44 and 46 of the hub assemblies 34 and 36, as well as to move parts of the hub assemblies in an axial direction.

This movement by parts of the hub assemblies 34 and 36 causes the same movement by the wings 14 and 16 (FIG. 1). In one example the wings 14 and 16 are initially moved axially to create clearance from the fuselage 20 (FIG. 1), and are also move rotationally to the deployed position. This rotational movement is accompanied by an axial movement during the travel of the wings 14 and 16, to bring the wings 14 and 16 into the fuselage 20 when the wings 14 and 16 reach the deployed positions. Bringing the wings 14 and 16 in closer to the fuselage 20 may improve aerodynamics of the aircraft 10.

The deployment of the wings 14 and 16 may be part of a launch process of the aircraft 10. The wings 14 and 16 being in a stowed condition may allow the aircraft to be launched in a compact configuration, with the wings 14 and 16 being deployed in the initial stages of flight.

A frame 50 secures both of the hub assemblies 34 and 36. The actuator 40 is mechanically coupled to the frame 50 through a hinge 52, which allows some relative movement of the actuator 40 relative to the frame 50. The frame 50 is itself secured to structure of the aircraft 10 (FIG. 1).

Figure 4:
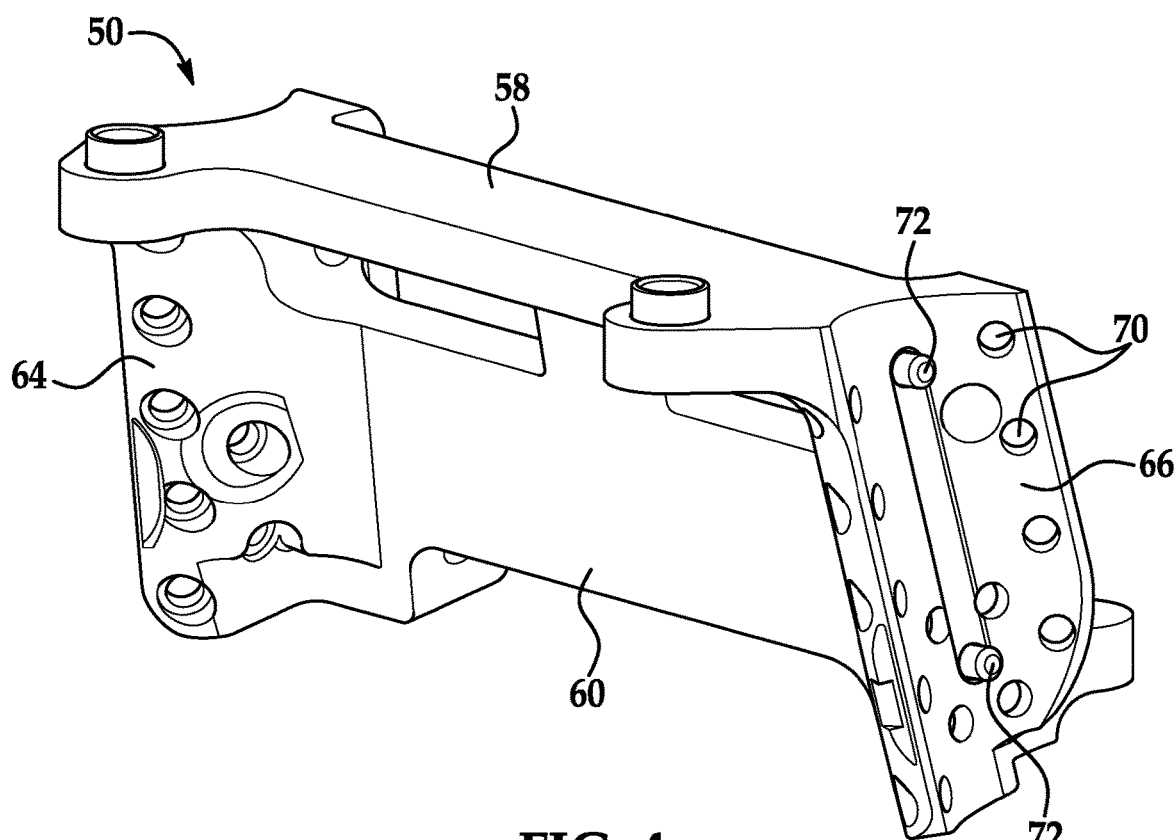
FIG. 4 is an oblique view of a frame of the deployment system of FIG. 3.

FIG. 4 shows additional details of the frame 50. The frame 50 may be made of aluminum or another suitable material, such as steel or titanium. The frame 50 includes a pair of linking members 58 and 60, at an angle to one another, that separate and support a pair of curved ends 64 and 66, which have recesses for receiving the hub assemblies 34 and 36 (FIG. 2). The curved ends 64 and 66 each have mounting holes 70 for receiving fasteners, such as bolts or rivets, for securing the hub assemblies 34 and 36 to the frame 50. There may also be protrusions 72 at the ends 64 and 66, for engaging corresponding recesses in the hub assemblies 34 and 36.

Figure 5:
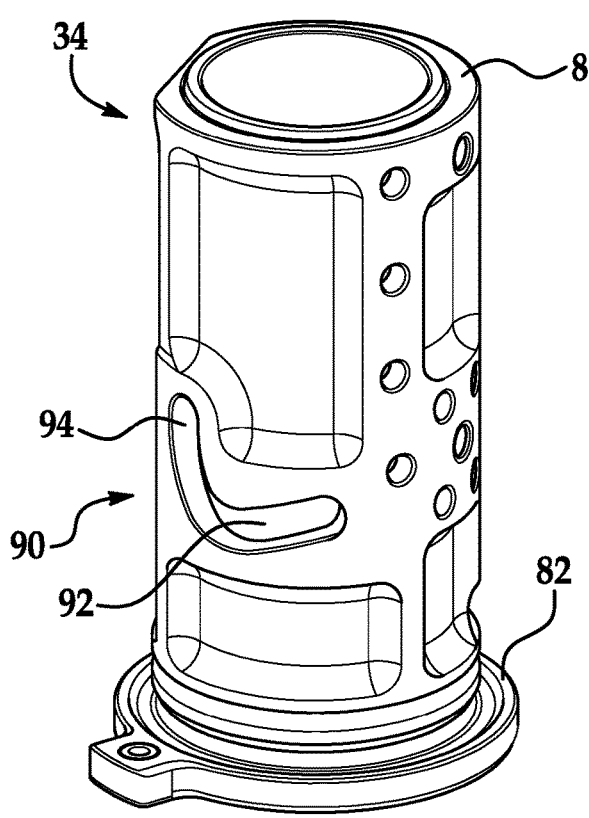
FIG. 5 is an oblique view of parts of one of the hub assemblies of the deployment system of FIG. 3.
Figure 6:
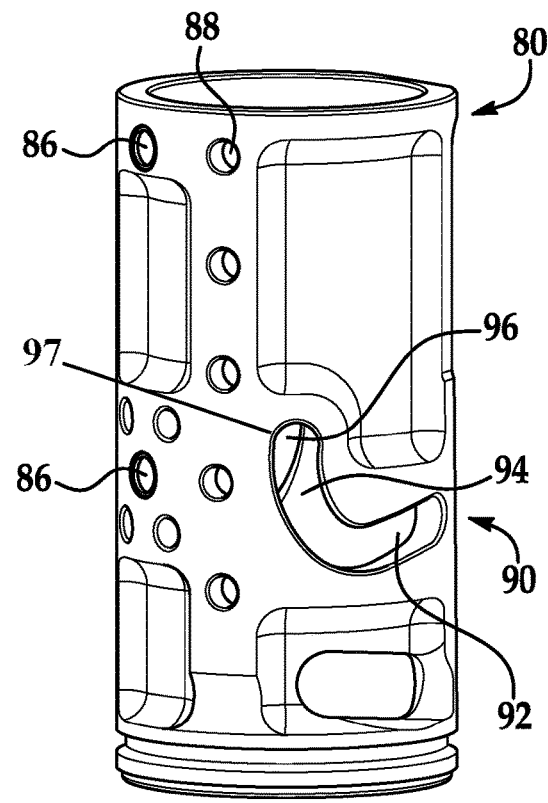
FIG. 6 is an oblique view of an outer tube of the hub assembly of FIG. 5.
Figure 7:
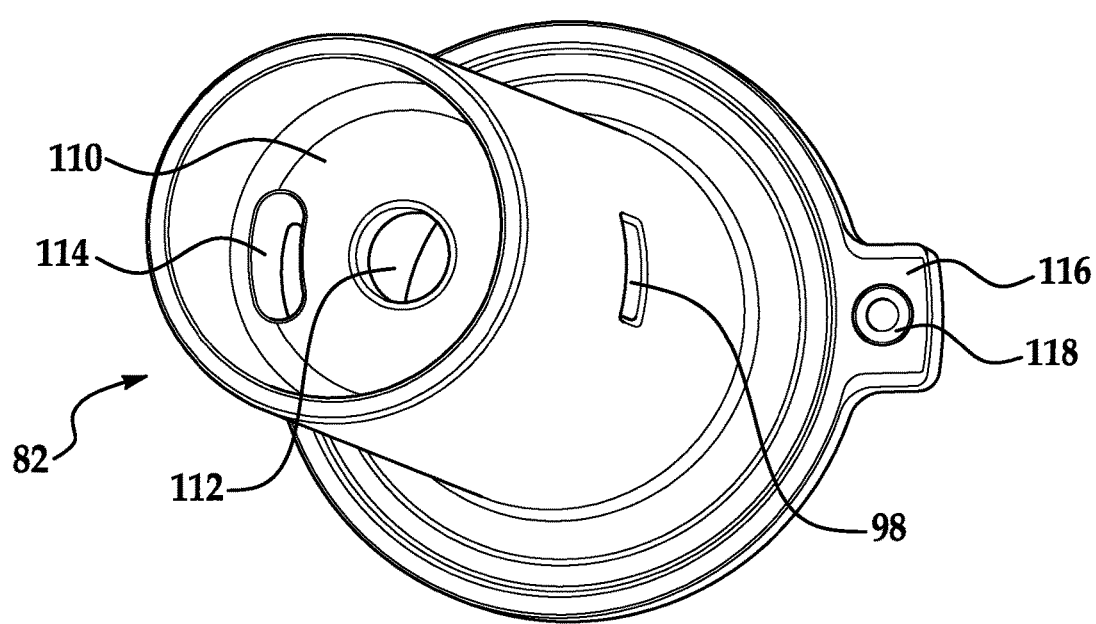
FIG. 7 is an oblique view of an inner tube of the hub assembly of FIG. 5.

FIGS. 5-7 show details of one of the hub assemblies, the hub assembly 34. The hub assembly 36 (FIG. 3) may have similar features, and may be substantially identical to the hub assembly 34. The hub assemblies 34 and 36 may be configured so as to be symmetric (mirror images) across a center plane of the aircraft 10 (FIG. 1) and the frame 50 (FIG. 3). The hub assembly 34 includes an outer tube 80 and an inner tube 82. The outer tube 80 is fixed to the frame 50 (FIG. 4), and the inner tube 82 moves along with the wing 14, so the inner tube 82 is able to slide and rotate relative to the outer tube 80.

The outer tube 80 includes recesses 86 for receiving the protrusions 72 (FIG. 4) of the frame 50 (FIG. 4). The outer tube 80 also has fastener holes 88 that line up with the frame's mounting holes 70 (FIG. 4), for receiving fasteners to secure the hub assembly 34 to the frame 50.

The outer tube 80 also has a pair of cam slots 90 therein, with the cam slots 90 being diametrically opposed 180 degrees apart from one another on opposite sides of the outer tube 80. The cam slots 90 are used to guide the inner tube 82 and the parts that are attached to it (the mount 24 and the wing 14), during the deployment. The cam slots 90 may have any of a variety of suitable shapes. In some embodiments, such as the illustrated embodiment, the cam slots 90 have a shape that provides both axial and rotational movements of the inner tube 82 relative to the fixed outer tube 80. The cam slots 90 may have a J-shape, with a first portion 92 that provides an initial slight outward axial motion combined with a rotational motion, followed a second portion 94 by an axial inward motion as the rotational motion continues. The initial axial outward motion (combined with a rotational motion) may provide clearance between the wing 14 (FIG. 1) and the fuselage 20 (FIG. 1) for the deployment. The final axial inward motion (again combined with a rotational motion) may pull the wing 14 close into engagement with the fuselage 20, which may provide for better aerodynamics. In one embodiment the wings 14 and 16 may be lifted 0.8 cm (0.3 inches) away from the fuselage 20 (FIG. 1) during the first 40% or wing rotation, may be drawn back in toward the fuselage 20 by 2.4 cm (0.95 inches) during the remaining 60% of wing rotation, and may be drawn in an additional 0.4 cm (0.15 inches) after the deploying rotation of the wings 14 and 16. This are only example values and many variations are possible.

The terminus 96 of the second portion 94 may be principally in an axial (vertical) direction, such as by being more axial than rotational. More narrowly, the direction of the terminus 96 of the second portion 94 of the slots 90 may have a slope (vertical:rotational) of at least 10:1, or may be substantially axial, for example being axial to within 1%, 2%, 5%, or 10%. This puts material of the outer tube 80 rotationally on either side of a follower in the cam slots 90. Such a configuration aids in maintaining the wing 14 (or other deployable device) in a deployed position, since forces tending to move the wing 14 in a rotational direction, such as away from the deployed position, are mostly not in the direction that the cam follower would need to take to move along the cam slots 90.

Once a follower such as a lift bar (discussed below) enters the substantially axial or vertical portion 96 of the J-slots 90, the mechanism motion of the lift bar, the inner tube 82, and hence the wing 14, is irreversible with respect to rotation. The lift bar could still move up/down, back-driving components such as the walking links and the slew ring (discussed below), but will not rotate any further. The width of the J-slot cam slots 90 for all but the last length (e.g., 2.5 mm (0.1 inch)) of the vertical portion terminus 96 may be considerably wider (e.g., 0.25 mm (0.01 inch) wider) than the follower (lift bar), to provide free-running clearance. At the very end of the terminus 96 that width is reduced, at a reduced-width portion 97, so that the lift bar (follower) will fit tightly in cam slot 90, assuring precise angular positioning of the wings 14 and 16, preventing rotation of the wings 14 and 16 due to mechanism backlash. This provides a "locking" of the wings 14 and 16 in their deployed positions, allowing the wings 14 and 16 to resist angular movement from aerodynamic forces.

The inner tube 82 includes a through slot 98 to receive for a cam follower, a lift bar that is discussed below. The through slot 98 has a shape that corresponds to the portion of the bar that engages the through slot 98. The inner tube 82 has an inner platform 110, recessed downward from a top side of the inner tube 82. The platform 110 has a center hole 112 and a pair of curved adjustment slots 114 that are diametrically-opposed, on opposite sides of the center hole 112.

The inner tube 82 also has a flange or torque tang 116, which is used for engaging a corresponding recess in the wing mount 24 (FIG. 3), as described further below. The flange 116 also includes a receiver 118 that is part of a detent mechanism, also described further below.

Figure 8:
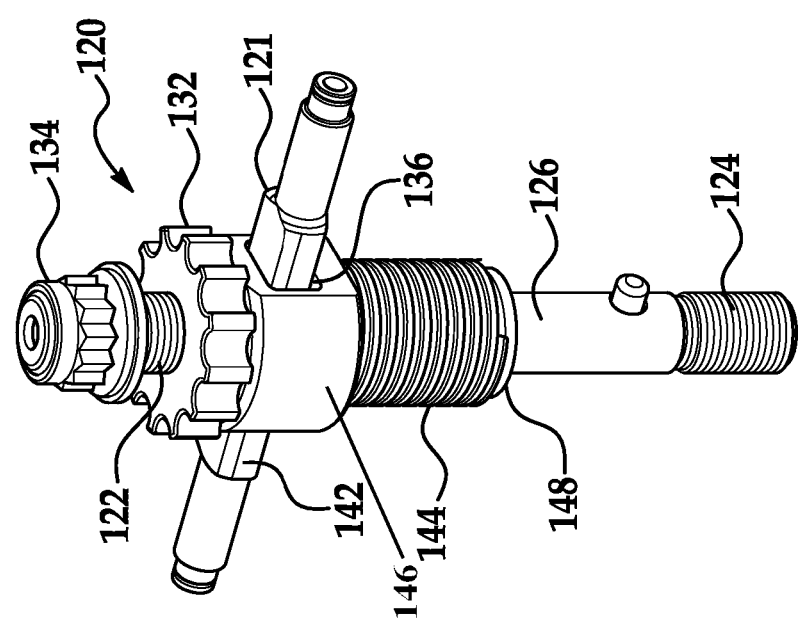
FIG. 8 is an oblique view showing additional parts of the hub assembly, a tension rod and lift bar additions to the parts of the hub assembly of FIG. 5.

FIG. 8 shows another part of the hub assembly 34, a tension rod 120 that passes through the center hole 112 (FIG. 7). The tension rod 120 holds together the parts of the hub assembly 34 (FIG. 5) and provides a way to adjust positioning of the wing mount 24 (FIG. 3). The tension rod 120 also receives a lift bar 121 that acts as a cam follower as it travels in the cam slots 90 (FIG. 7), as discussed further below.

The tension rod 120 has a pair of threaded ends 122 and 124 on opposite ends of a center portion 126. The threaded end 122 is for adjusting positioning of the tension rod 120 relative to the inner tube 82. The end 122 is inserted into the center hole 112 (FIG. 7), with an adjusting nut 132 below the platform 110 (FIG. 7), and a lock nut 134 above the platform 110. A tool (not shown) can be inserted through the adjustment slots 114 to turn the adjusting nut 132 to position the adjusting nut 132 in a desired position along the threaded end 122. The lock nut 134 can then be tightened to clamp the platform 110.

The central portion 126 of the tension rod 120 has a rectangular through-opening or window 136 that aligns with the through slot 98 (FIG. 7) in the inner tube 82 (FIG. 7), to receive a rectangular cross-section portion 142 of the lift bar 121. The opening 136 may be configured to allow slight vertical shifting (a tilting) of ends of the lift rectangular bar portion 142. For example a lower wall of the opening 136 may be slightly raised in the center, to allow pivoting of the bar portion 142. This allows relief of stresses caused by any slight asymmetry in the mechanism.

A coil spring 144 is wrapped around the central portion 126, between a widened portion 146 and a stop ring washer 148. The coil spring 144 provides a spring force to assist in ejecting the tight-fitting wing mount 24 from the inner tube 82, should the wing 14 ever need to be removed.

Figure 9:
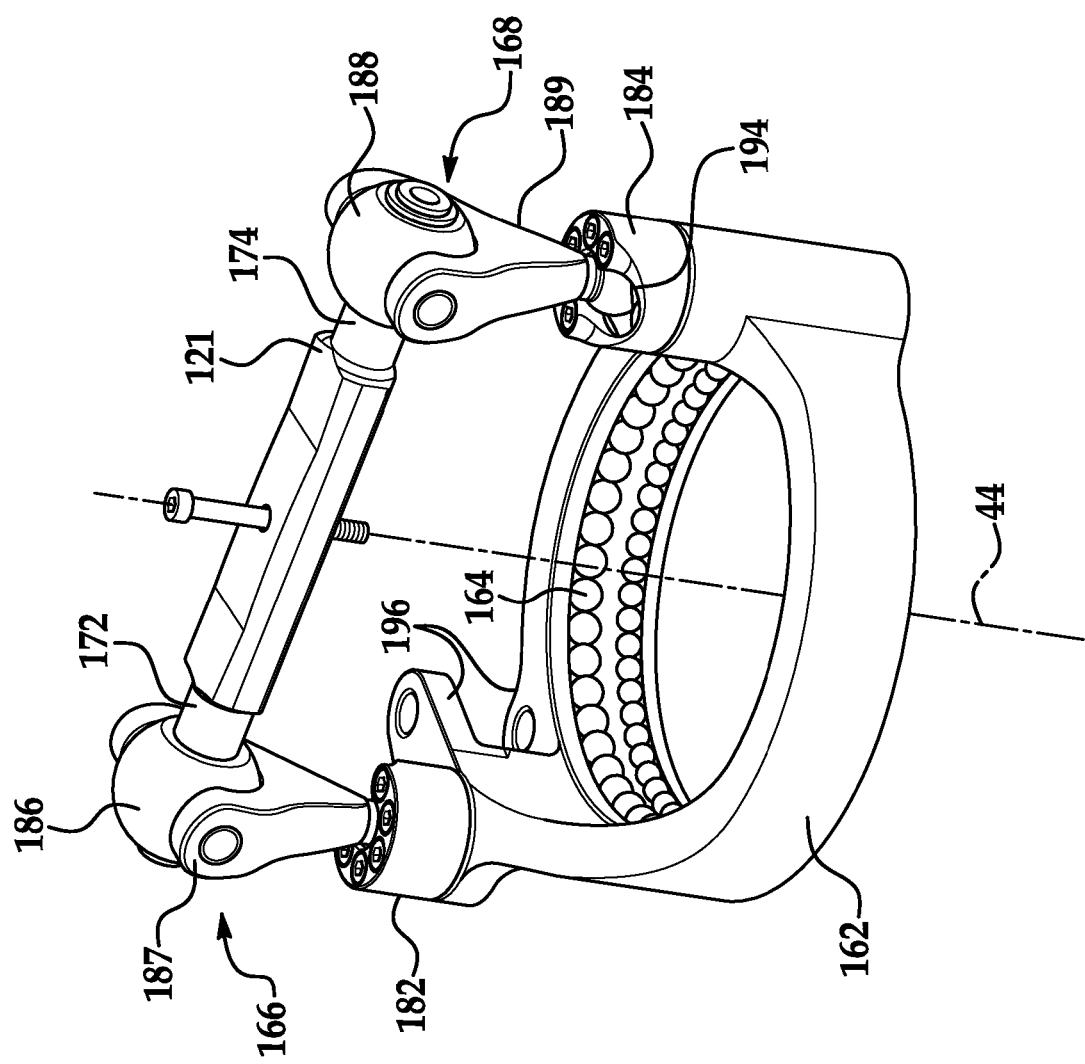
FIG. 9 is an oblique view showing rotational parts of the hub assembly of FIG. 5.

FIG. 9 shows motion components of the hub assembly 34: a slew ring 162 with bearings 164, a pair of walking links 166 and 168 on respective ends 172 and 174 of the lift bar 121, and a pair of knuckle caps 182 and 184. The slew ring 162 is mounted to a bottom end of the outer tube 80, with the bearings 164 facilitating motion of the slew ring 164 about the central axis 44 of the hub assembly 34.

The walking links 166 and 168 employ low-friction cross-joints to engage the lift bar ends 172 and 174. An alternative configuration could utilize spherical bearings instead of the cross-joints. The walking link 166 includes sleeve member 186 and a fork 187. The sleeve 186 receives the bar end 172 in a through hole, and is pivotally mounted to the fork 187. The walking link 168 includes a sleeve 188 and a fork 189 in a similar arrangement. The sleeves 186 and 188 are axially constrained but free to pivot at the bar ends 172 and 174.

The knuckle caps 182 and 184 retain ball ends, such as a ball end 194, of the forks 187 and 189, within corresponding sockets in the slew ring 162. The forks 187 and 189 are able to pivot relative to the slew ring 162 using this ball-and-socket coupling.

The slew ring 162 has a clevis 196 for receiving an end of an actuator rod or tube. The clevis 196 is the point at which force is applied by the actuator 40 (FIG. 3) to rotate the slew ring 162.

Figure 10:
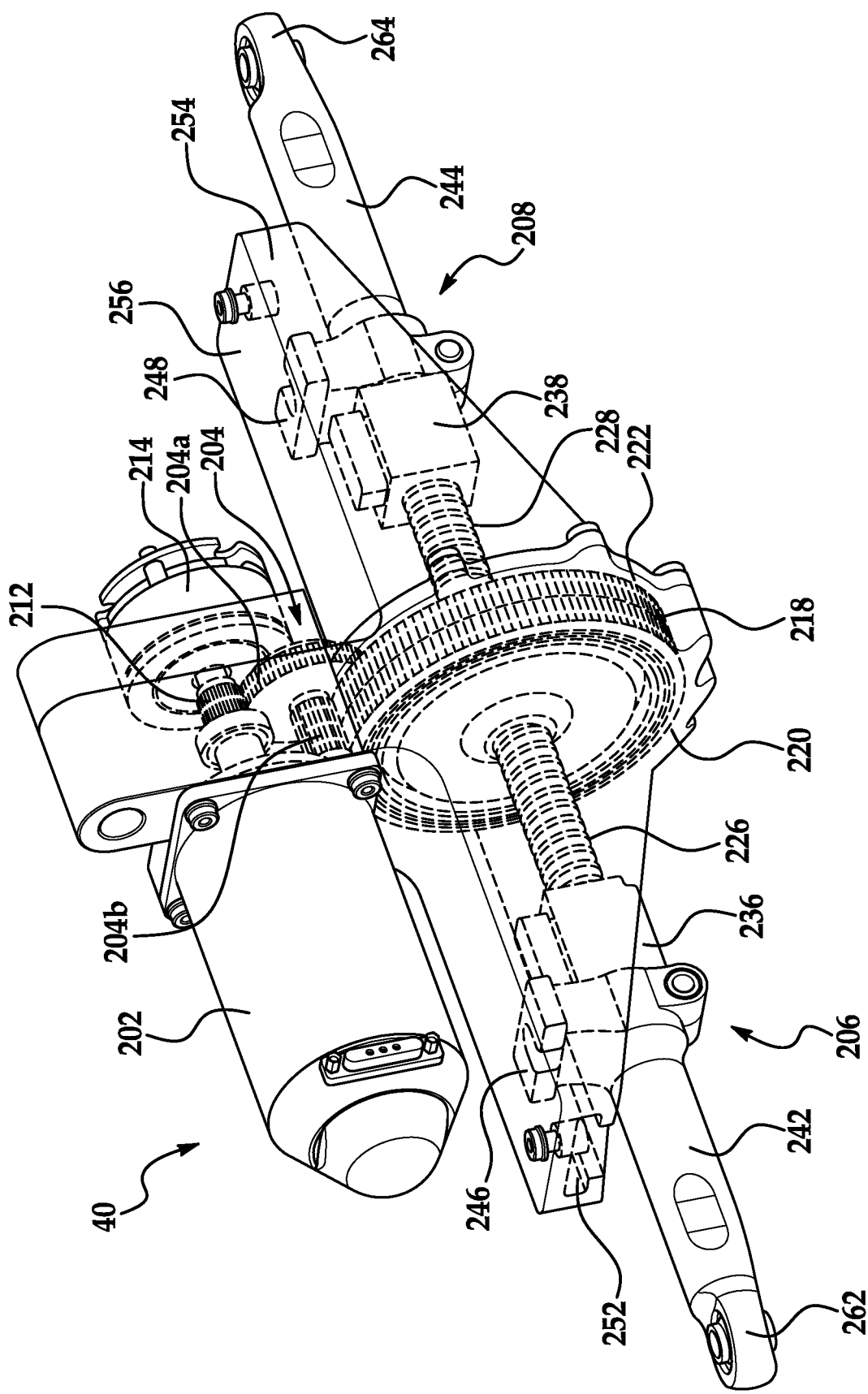
FIG. 10 is an oblique view of the actuator of the hub assembly of FIG. 3.
Figure 11:
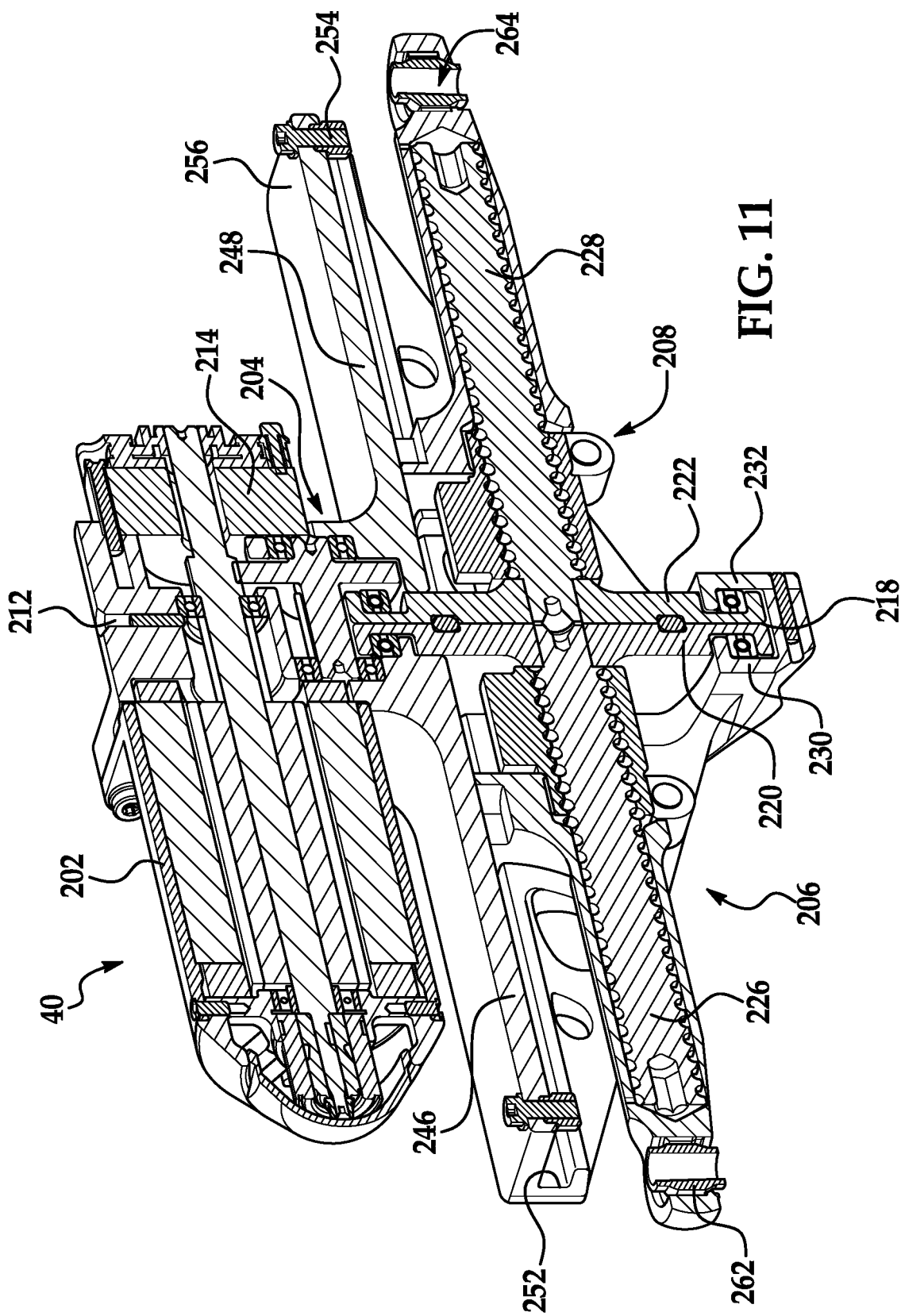
FIG. 11 is a sectional view of the actuator of FIG. 10.

FIGS. 10 and 11 show details of the actuator 40. The actuator 40 is essentially a high-efficiency, powered, push/pull turnbuckle, which is reversible in operation (able to be deployed and retracted multiple times, for instance for testing). The actuator 40 includes a motor 202, gearing 204, and a pair of ballscrew drive retractor links 206 and 208. The retractor links 206 and 208 are coupled to the slew rings, such as slew ring 162, of the respective hub assemblies 34 and 36. The motor 202 is used to drive both of the retractor links 206 and 208 simultaneously, with the retractor links 206 and 208 turning parts of the hub assemblies 34 and 36 to simultaneously deploy the wings 14 and 16.

The motor 202 may be a standard electric motor, using electric power (such as from a battery) to turn a motor shaft 212. The motor 202 may have a brake 214 coupled to it, to act as a lock to prevent movement of the retractor links 206 and 208 when the system is not in the process of deployment (when in the fully stowed or fully deployed state).

The gearing 204 is a compound reduction gear set (consisting of 204a spur and 204b pinion) that transmits rotation of the motor shaft 212 to both spur gears 220 and 222, coupled together back to back. Alternatively the spur gear 218 may be a unitary single-piece spur gear. The spur gears 220 and 222 have respective threaded shafts 226 and 228 attached at their centers. The threaded shafts 226 and 228 are coaxial, extending away in opposite directions from the compound spur gear 218. The shafts 226 and 228 are threaded in opposite directions.

The spur gears 220 and 222 may have a large number of teeth, for example each having at least 120 teeth. The large number of teeth minimizes the effect of any misalignment of the teeth between the two spur gears 220 and 222. It will be appreciated that other numbers of teeth may be utilized. It is desirable that the spur gears 220 and 222 have a large enough diameter to permit fitment of bearings, such as bearings 230 and 232, inside of the gears 220 and 222, and have fine enough gear teeth (a large enough tooth count) to minimize asymmetry in the assembled actuator 40.

Ballscrew nuts 236 and 238 engage the threaded shafts 226 and 228 such that the nuts 236 and 238 move along the shafts 226 and 228 as the shafts 226 and 228 are rotated. Respective link tubes 242 and 244 are attached to the nuts 236 and 238, and move along with the nuts 236 and 238. The link tubes 242 and 244 are hollow, allowing portions of the threaded shafts 236 and 238 to rotate freely within them. The link tubes 242 and 244 include respective guide keys 246 and 248, which engage tracks 252 and 254 on a housing part 256, to aid in guiding movement of the link tubes 242 and 244, and to react to torques. Far ends 262 and 264 of the link tubes 242 and 244 are configured to engage clevises of the slew rings (such as the clevis 196 (FIG. 9) of the slew ring 162 (FIG. 9). To this end the ends 262 and 264 may have holes for receiving a suitable pins (not shown), and with the holes lined with a low-friction material, such as mounted on suitable spherical bearings, to facilitate rotation about the pins.

In operation the nuts 236 and 238 and the link tubes 242 and 244 are initially away from gearing 218 and 220. Operation of the motor 202 pulls the nuts 236 and 238 and the link tubes 242 and 244 in toward the center of the actuator 40.

Figure 13:
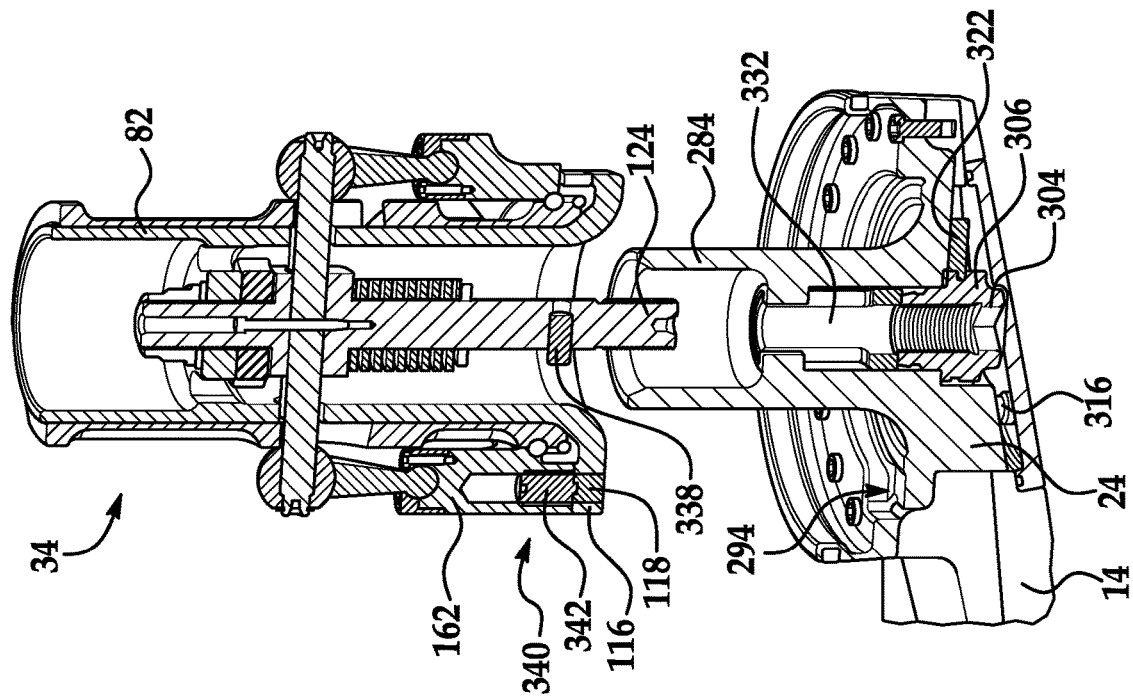
FIG. 13 is an exploded view of the parts of FIG. 12.
Figure 12:
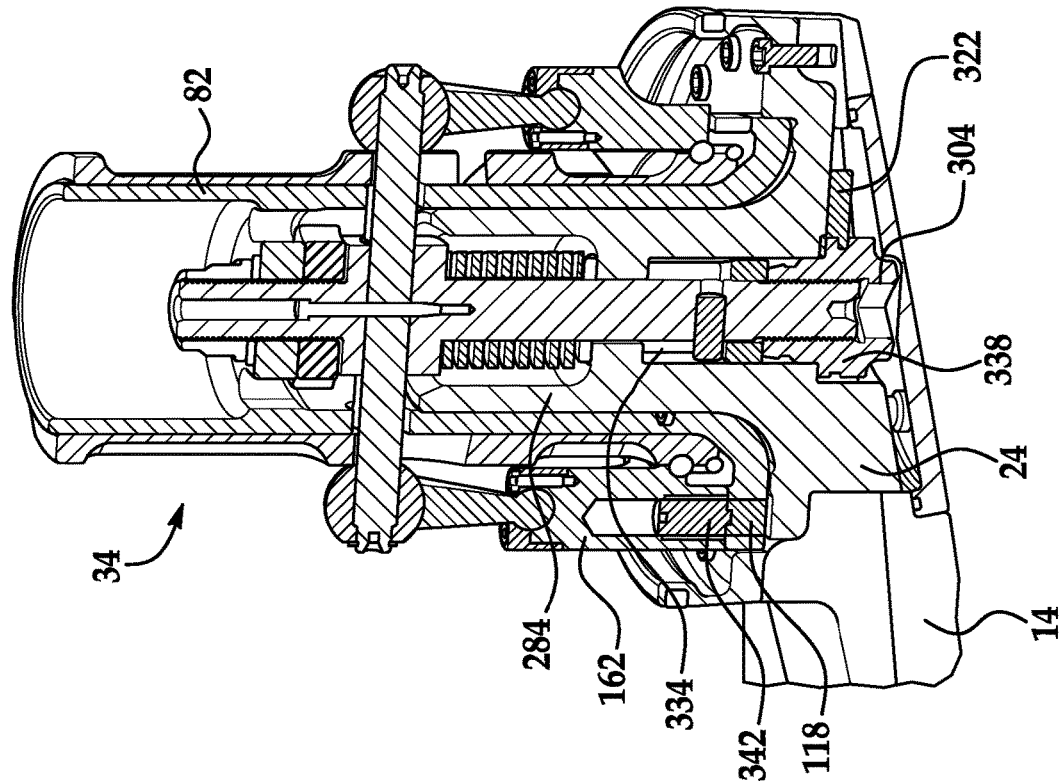
FIG. 12 is a sectional view of the hub assembly of FIG. 5, and its coupling to a wing mount.

FIGS. 12 and 13 show the assembled hub assembly 34, and its coupling to the wing hub 24. FIGS. 14-16 show further details of the connection of the wing hub 24. The wing hub 24 has a shank 284 that is a tight fit with the inner tube 82 of the hub assembly 34. The wing 14 is mounted to the wing hub 24 by a series of bolts or other fasteners on a periphery of the wing hub 24. In an alternate configuration, the wing hub is integral with the wing itself.

Torque is transmitted between the inner tube 82 and the wing hub or mount 24 by the torque tang 116 on the inner tube 82, which engages a corresponding recess 294 on the wing hub 24.

The wing mount 24 is secured to the hub assembly 34 by use of a nut 304 that has an internally-threaded shaft that threads onto the tension rod threaded end 124. This secures material of the wing mount 24 that is underneath a nut head 306 of the nut 304. The nut 304 is tightened by engagement of an appropriate tool with a recess 308, such as a square or other-shaped recess, in the nut head 306, in this case a standard ½" drive socket wrench extension. The nut head 306 has ratchet teeth 312, which engage a spring-loaded and mechanically retained ratchet tube 316, to keep the nut 304 from loosening once it is tightened. A cam-actuated nut retainer plate 322 is used to engage a groove 324 in the nut head 306 during removal of the nut 304. This transfers forces on the nut 304 to the wing mount 24 during removal of the wing 14, to help extract the wing hub shank 284 from an inner surface 326 of the inner hub 82. The nut 304 may be loosened to allow the wing 14 to be rotated. The nut 304 may be removed entirely to allow complete removal of the wing 14.

An angle limiter 330 is coupled to the nut 304, and has an extension 332 that extends into and partially fills a volume 334 in the hub assembly 34. The extension 332 limits travel of a pin 338 that protrudes out of one side of the tension rod 120. The pin 338 can move up and down (axially) to allow the wing mount 24 to disengage from the torque tang 116, while still keeping the nut 304 engaged with the tension rod threaded end 124. Also the extension 332 limits the rotation of the wings 14 and 16, preventing the wings 14 and 16 from colliding with each other, either in the stowed or deployed configurations.

A detent mechanism 340 helps maintain the wing 14 deployed once the deployment process is completed. The mechanism 340 includes a spring-loaded ball or other object 342 in a cavity on the slew ring 162 that drops down and engages a recess in the receiver 118 once the wing 14 has been rotated into a deployed condition.

Figure 17:
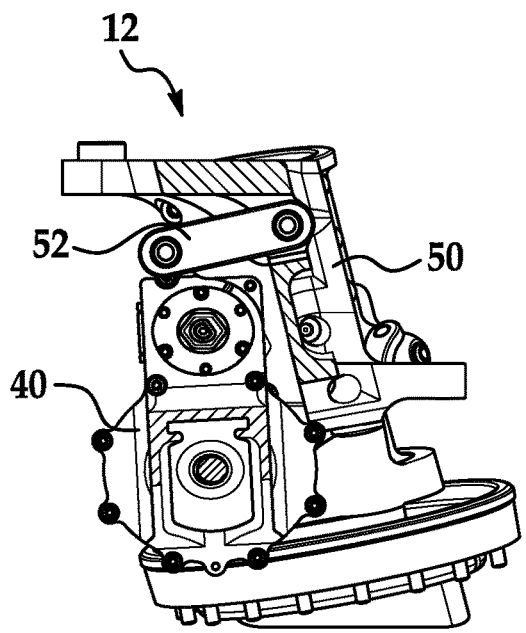
FIG. 17 is an oblique view showing positioning of the actuator relative to other parts of the system, at a first time in the deployment process.
Figure 18:
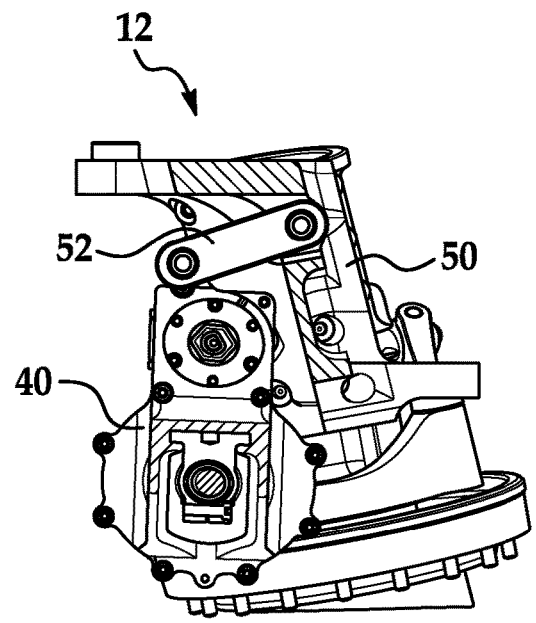
FIG. 18 is an oblique view showing position of the actuator at a second time.
Figure 19:
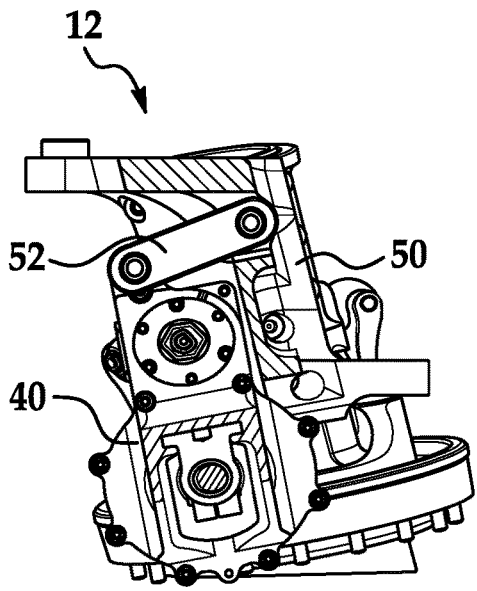
FIG. 19 is an oblique view showing position of the actuator at a third time.

FIGS. 17-19 illustrate operation of the hinge 52, showing three steps in the deployment process. The actuator 40 moves relative to the frame 50 during the process, changing position along the hinge 52 as a function of position of the slew ring 162. The hinge 52 is used to centrally position and stabilize the actuator 40, rotationally grounding the actuator 40 to the frame 50.

Figure 20:
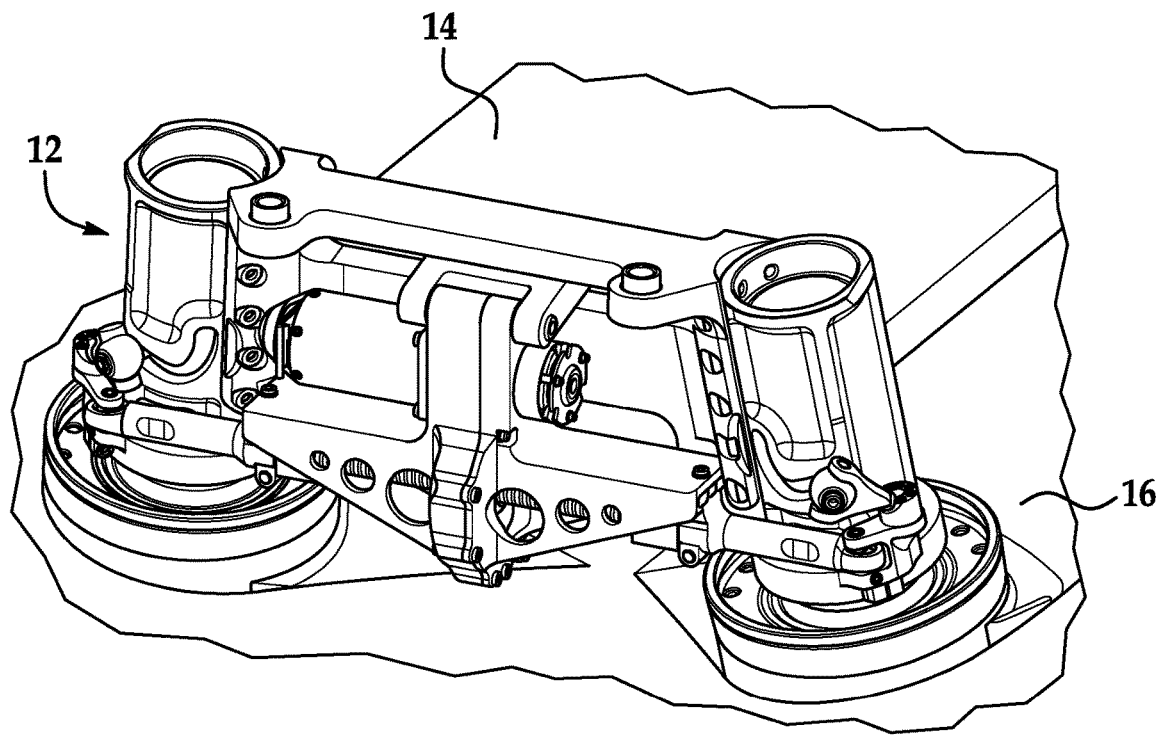
FIG. 20 is an oblique view showing the system with the wings in a stowed configuration.
Figure 21:
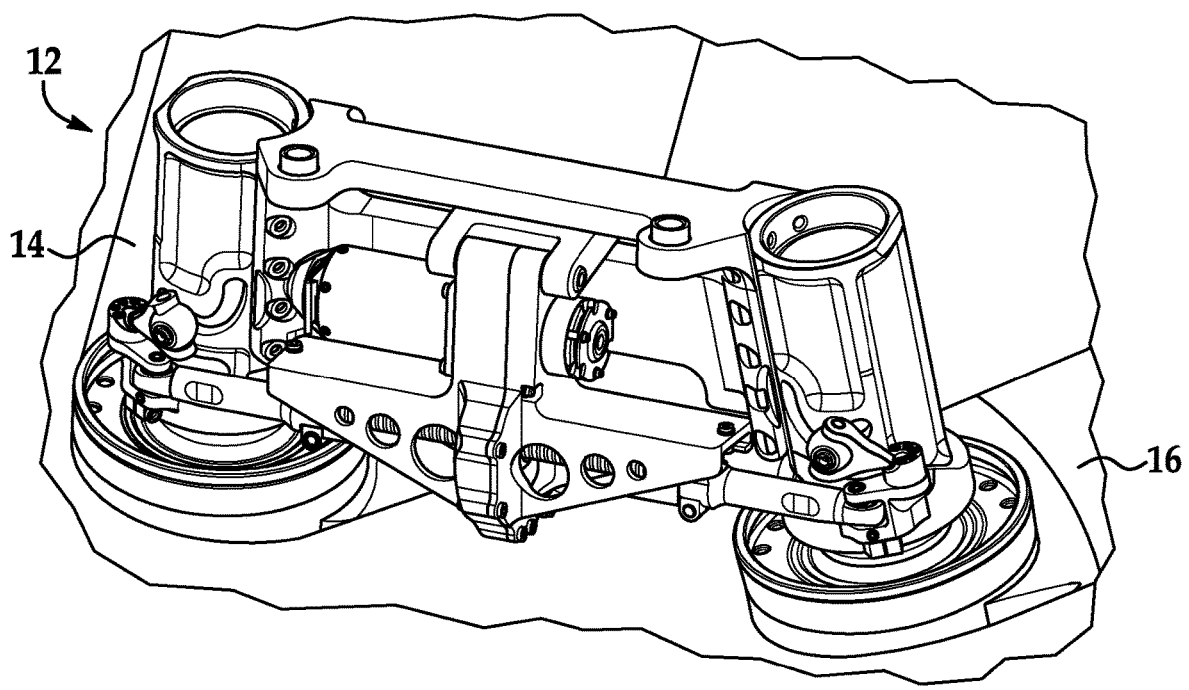
FIG. 21 is an oblique view showing the system with the wings at an initial stage in the deployment process.
Figure 22:
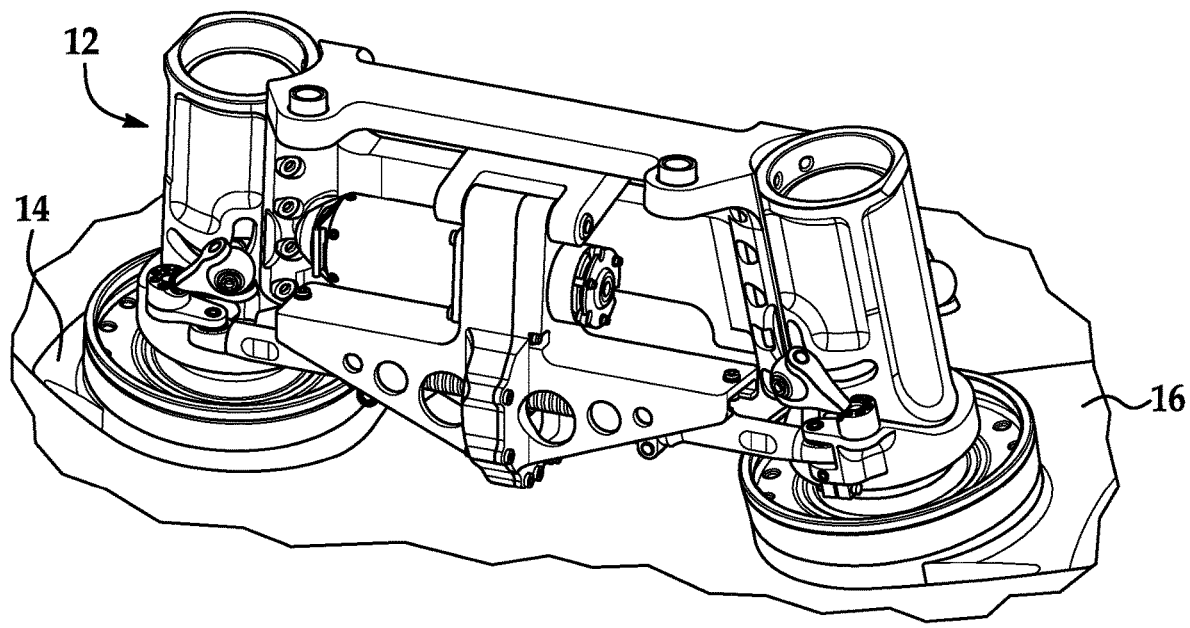
FIG. 22 is an oblique view showing the system with the wings at a further stage in the deployment process.
Figure 23:
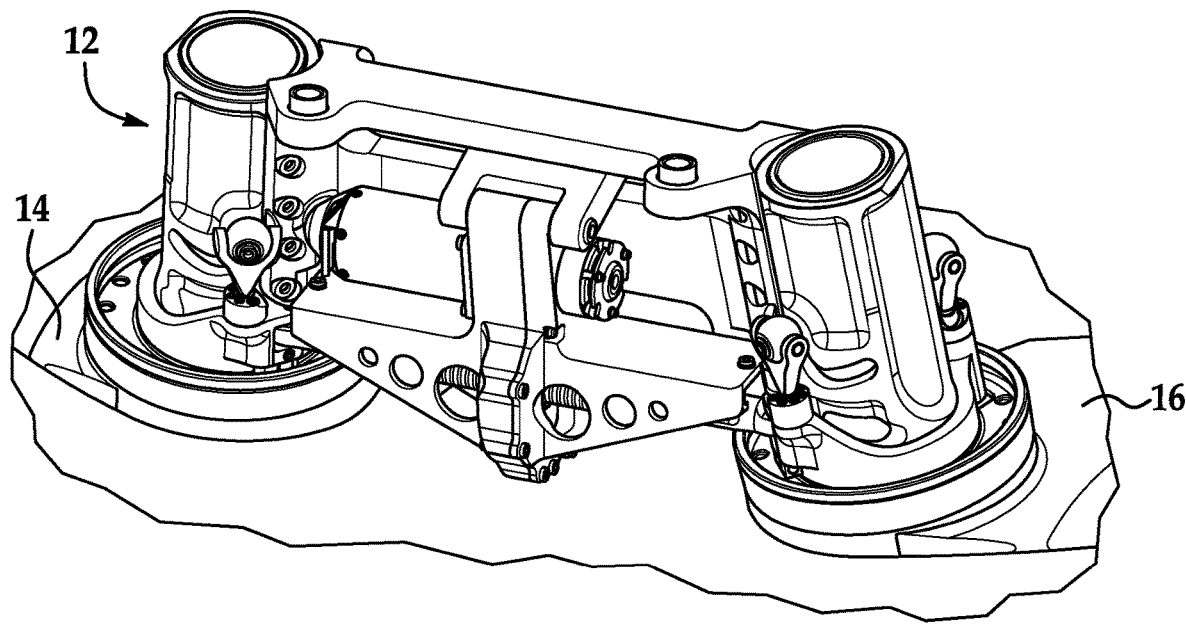
FIG. 23 is an oblique view showing the system with the wings in a deployed configuration.

FIG. 20-23 show the system 12 in four steps during the deployment of the wings 14 and 16. FIG. 20 shows the stowed position. FIG. 21 shows an initial movement in the deployment process, with the wings 14 and 16 moved axially away from the fuselage. FIG. 22 shows a further step in the deployment process. FIG. 23 shows the wings 14 and 16 fully deployed.

Many of the features are described herein with regard to one hub assembly or wing. It will be appreciated that similar features may be found in both hub assemblies, and for the extension of both of the wings. Indeed, one advantage of the system described herein is that it provides for symmetric deployment of the wings 14 and 16. In particular, the use of the single actuator 40 to simultaneous deploy both of the wings 14 and 16 provides for good symmetry of operation. This may result in (for example) symmetrical aerodynamic forces as the wings 14 and 16 are in the process of deployment.

Another advantage is that the wings 14 and 16 deploy principally by slicing through the air stream around the aircraft 10. This may provide less disruption of the air stream, less in the way of undesired aerodynamic forces, and/or lighter loads on the wings 14 and 16, relative to other deployment mechanisms.

The various parts of the system 12 may be made using suitable materials. For example many of the components may be made from suitable metals, such as steel, titanium, or aluminum.

The system 12 has been described above in terms of deploying a pair of wings 14 and 16. It will be appreciated that system 12, perhaps with suitable modifications, may be used to deploy a wide variety of other devices, such as control surfaces or lift surfaces for aerial vehicles, fins or other parts of water vehicles, and/or any of a variety of objects, such as solar panels, for vehicles, such as space vehicles.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A deployment system comprising:
   a mount configured to receive a device to be deployed;
   a hub assembly that includes a tube having a cam slot; and
   an actuator configured to rotate the mount relative to the tube;
   wherein when the actuator causes the mount to rotate relative to the tube, a follower engaging the cam slot causes the mount to move both axially and rotationally relative to the tube;
   wherein the tube is an outer tube;
   wherein the hub assembly further includes an inner tube within the outer tube, wherein the inner tube is connected to the mount and moves along with the mount;
   wherein the hub assembly further includes a tension rod located along a central axis of the hub assembly, wherein the tension rod mechanically engages the inner tube and the mount;
   wherein the tension rod has opposite first and second threaded ends;
   wherein the first threaded end has a pair of nuts thereon that bear on opposite major surfaces of a platform that is within the inner tube; and
   wherein the second threaded end threadedly engages the mount.

2. The deployment system of claim 1, wherein the tension rod has a spring therearound that provides a biasing force between the inner tube and the mount.

3. A deployment system comprising:
   a mount configured to receive a device to be deployed;
   a hub assembly that includes a tube having a cam slot; and
   an actuator configured to rotate the mount relative to the tube;
   wherein when the actuator causes the mount to rotate relative to the tube, a follower engaging the cam slot causes the mount to move both axially and rotationally relative to the tube;
   wherein the follower is part of a bar that passes through the hub assembly;
   wherein the cam slot is a first cam slot;
   wherein the tube includes a second cam slot diametrically opposed to the first cam slot; and
   wherein the cam slots each include a first portion that provides outward axial motion combined with rotational motion, and a second portion that provides inward axial motion combined with rotational motion;
   further comprising a slew ring that is mechanically coupled to the actuator such that the actuator selectively rotates the slew ring about the hub assembly;
   wherein the follower is part of a bar that passes through the hub assembly; and
   further comprising walking links that mechanically couple the slew ring to the bar; and
   wherein the slew ring, the walking links, and the bar all rotate as a unit about a central axis of the hub assembly;
   wherein the walking links have ball-and-socket connections with the slew ring; and
   wherein the walking links have cross-joint connections with ends of the bar.

4. A deployment system comprising:
   a mount configured to receive a device to be deployed;
   a hub assembly that includes a tube having a cam slot; and
   an actuator configured to rotate the mount relative to the tube;
   wherein when the actuator causes the mount to rotate relative to the tube, a follower engaging the cam slot causes the mount to move both axially and rotationally relative to the tube;
   wherein the mount is a first mount;
   wherein the hub assembly is a first hub assembly; and
   further comprising:
      a second mount configured to receive a second device to be deployed; and
      a second hub assembly that includes a second hub having a second cam slot;
   wherein the actuator is configured to rotate the second mount relative to the second hub; and
   wherein when the actuator causes the second mount to rotate relative to the second hub, a second follower engaging the second cam slot causes the mount to move both axially and rotationally relative to the hub.

5. The deployment system of claim 4, wherein the follower is part of a bar that passes through the first hub assembly.

6. The deployment system of claim 4,
   wherein the follower is part of a bar that passes through the first hub assembly;
   wherein the cam slot is a first cam slot;
   wherein the tube includes a second cam slot diametrically opposed to the first cam slot; and wherein the cam slots each include a first portion that provides outward axial motion combined with rotational motion, and a second portion that provides inward axial motion combined with rotational motion.

7. The deployment system of claim 6, wherein the cam slots are J-shape cam slots.

8. The deployment system of claim 7, wherein for each of the cam slots a terminus of the cam slot is substantially axial in orientation.

9. The deployment system of claim 8, wherein for each of the cam slots the terminus has a reduced-width region, providing less clearance about the follower than other portions of the cam slot.

10. The deployment system of claim 6, wherein circular cross-section ends of the bar engage the cam slots.

11. The deployment system of claim 4,
wherein the tube is an outer tube; and
wherein the first hub assembly further includes an inner tube within the outer tube, wherein the inner tube is connected to the mount and moves along with the mount.

12. The deployment system of claim 11, wherein the first hub assembly further includes a tension rod located along a central axis of the first hub assembly, wherein the tension rod mechanically engages the inner tube and the mount.

13. The deployment system of claim 4, further comprising a slew ring that is mechanically coupled to the actuator such that the actuator selectively rotates the slew ring about the first hub assembly.

14. The deployment system of claim 13,
wherein the follower is part of a bar that passes through the first hub assembly; and
further comprising walking links that mechanically couple the slew ring to the bar; and
wherein the slew ring, the walking links, and the bar all rotate as a unit about a central axis of the first hub assembly.

15. The deployment system of claim 13, wherein the actuator includes a threaded shaft, driven by a motor, such that when the shaft is turned a link tube, coupled to the slew ring, that moves along the shaft.

16. The deployment system of claim 15,
wherein the actuator is a ball screw actuator,
wherein the ball screw actuator further includes a ball screw nut that is attached to the link tube, and
wherein the ball screw nut moves along the shaft, along with the link tube, as the link tube moves along the shaft.

17. The deployment system of claim 15,
wherein the actuator further includes gearing between a motor shaft of the motor, and the threaded shaft; and
wherein the gearing includes a driven gear having at least 120 teeth.

18. The deployment system of claim 4,
further comprising a frame to which the first hub assembly is attached and to which the actuator is mechanically coupled;
wherein the actuator is mechanically coupled to the frame by a hinge connection.

19. The deployment system of claim 4,
wherein the deployment system is a wing deployment system used to deploy wings that are attached to the mounts; and
wherein the wing deployment system is part of an aerial vehicle.

* * * * *